Patented Jan. 16, 1951

2,538,005

UNITED STATES PATENT OFFICE 2,538,005

HALOGENATED DERIVATIVES OF THE NAPHTHOQUINONE-IMINE SERIES AND A PROCESS FOR THEIR MANUFACTURE

Valentin Kartaschoff and Ernst Merian, Basel, Switzerland, assignors to Sandoz Limited, Basel, Switzerland, a Swiss firm No Drawing. Application June 22, 1948, Serial No. 34,553. In Switzerland June 30, 1947

11 Claims. (Cl. 260—396)

The present invention relates to new halogenated derivatives of the naphthoquinone-imine series and to a process for their manufacture.

It has been found that new halogenated derivatives of the naphthoquinone-imine series may be prepared by subjecting halogenated amino-hydroxy - 1.4 - naphthoquinone - imines-(1) during or after their formation to a hydrolysis, whereby the amino group becomes replaced by a hydroxy group giving as final products halogenated 5.8-dihydroxy - 1.4 - naphthoquinone-imines-(1).

The halogenated amino-hydroxy - 1.4 - naphthoquinone-imines-(1) used herein as starting materials can be prepared by halogenation of aminohydroxy - 1.4 - naphthoquinone - imines in the presence of glacial acetic acid, nitro-benzene, chlorobenzene or any other suitable solvent or by halogenation of the reduction products of alpha-alpha-dinitronaphthalenes during or after the reduction process in the presence of sulphuric acid.

The hydrolysis of the said aminohydroxy compounds can be carried out with mineral acids, diluted with water, or with mixtures of acids like sulphuric acid and glacial acetic acid. The hydrolysis goes generally very rapidly and the dihydroxy compounds are isolated by pouring their solutions into water in which they are insoluble. Thus their isolation is very easy.

The new products possess the following general formula

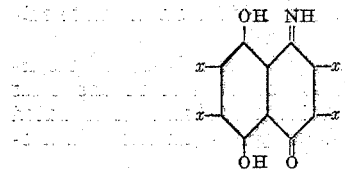

wherein at least one of the $x$'s stands for a halogen atom, and dye acetate silk and nylon into violet to reddish-blue shades possessing good fastness properties to light and gas fumes.

The following table shows the properties of some of the new compounds as compared to the starting products and known halogenated naphthazarine derivatives.

| | | | | | |
|---|---|---|---|---|---|
| Color of the solution in: | | | | | |
| ethanol | pure greenish blue | red orange | dark blue violet | reddish blue | blue violet. |
| H₂SO₄ | yellow | lilac | carmine red | carmine red | carmine red. |
| absorption bands in: | | | | | |
| ethanol | 630, 579 | 572, 530, 494 | 633, 584 | 635, 583 | 636, 583, 542 (?). |
| H₂SO₄ | | 596, 549 | 591, 546, 503 | 596, 547, 510 | 593, (?), 544, 508. |

The color reaction of the respective di- and tri-chloro compounds, i. e. the 3.7-dichloro-, 3.6.7-trichloro- and 3.6-dichloro-5.8-dihydroxy-1:4-naphthoquinone-imines-(1), is similar.

The following examples illustrate how the invention can be carried out in practice, but are by no means limitative. The parts represent parts by weight.

Example 1

A mixture consisting of 75 parts of 1.5-dinitronaphthalene and 21 parts of sulphur powder is introduced into 1500 parts of sulphuric acid monohydrate and after a homogeneous mixture has been obtained, 300 parts of 40% fuming sulphuric acid are added thereto. The charge is stirred and cooled down in such a manner that the temperature does not increase higher than up to 28° C. A test specimen taken out shows that it is soluble in ethanol with a violet colouration. To the reaction mixture are then added, while cooling, 210 parts of water in such a manner that the temperature is maintained at 20° C. After addition of water, 0.1 part of iodine and 120 parts of bromine are added thereto and the whole heated for about 2 hours at 80° C. At this temperature the charge is stirred for 10-12 hours, after which time the whole of the bromine has been taken up. The reaction mixture is then poured into a mixture of 5000 parts of ice and 1000 parts of water, filtered and washed until free from acid. In this manner 117 parts of a dark coloured product are obtained which contains about 48.5% of bromine and 3.6% of N. This product is soluble in concentrated sulphuric acid with a sherry-red colouration that becomes blue-violet on addition of paraformaldehyde. It consists merely of dibromo - 5.8 - dihydroxy - 1.4 - naphthoquinone-imine-(1).

*Example 2*

A mixture consisting of 10 parts of 1.5-dinitronaphthalene and 2.8 parts of sulphur powder is introduced into 200 parts of sulphuric acid monohydrate and treated at 20° C. with 40 parts of 40% fuming sulphuric acid. When a test specimen taken out shows that the product is soluble in water, 84 parts of water are added to the reaction mixture in such a manner that the temperature does not exceed 25° C. To the reaction mixture are added some iodine and 16 parts of bromine and the whole is heated at 80–85° C. After about 3 hours the bromine has completely been taken up. The reaction mixture is poured into a mixture of ice and water, the precipitated product filtered, washed and dried. In this manner about 18 parts of a dark coloured compound which is soluble in concentrated sulphuric acid with a sherry-red colouration that turns to blue-violet after addition of some paraformaldehyde is obtained. The new compound is difficultly soluble in ethanol with a blue-violet colouration.

*Example 3*

10 parts of an isomorphously crystallised mixture of 1.5- and 1.8-dinitronaphthalenes and 2.8 parts of sulphur powder are introduced into 200 parts of sulphuric acid monohydrate and treated in the same manner as described in Example 2. About 13 parts of a dark coloured product is obtained which is soluble in concentrated sulphuric acid with a red-brown colouration, but which on addition of some paraformaldehyde becomes violet-brown.

The new product is soluble in hot ethanol with a red-brown colouration.

*Example 4*

10 parts of 1.8-dinitronaphthalene are reduced and brominated in the manner described in Example 1. 16 parts of a dark coloured product are obtained which is soluble in concentrated sulphuric acid with a red-brown colouration, which becomes violet-black on addition of some paraformaldehyde. In hot ethanol it gives a bluish-red solution.

*Example 5*

110 parts of 1.8-dinitronaphthalene are introduced into 1500 parts of 96% sulphuric acid and heated with good stirring at 125° C. At this temperature there are added by portions within 1 hour 35 parts of iron powder and the reaction mass is stirred for 2–3 hours at 125–130° C. A test specimen taken out dissolves in ethanol with a violet colouration. The charge is then allowed to cool down to 40° C. and 90 parts of water are added with good cooling. After the addition of water is finished, 150 parts of bromine are allowed to run in and the temperature is increased up to 75–90° C. A test specimen taken out dissolves in ethanol with a brown colouration. The stirring and heating is then continued for 10–12 hours until the reflux of bromine ceases. The reaction mass is then allowed to cool down somewhat and treated with a stream of air in order to blow away the hydrobromic acid, then cooled down to 30–40° C. and poured into a mixture of water and ice. The precipitated product is filtered, washed until free from acid and dried. In dry state it is a dark blue powder, soluble in ethanol with a reddish violet colouration and in concentrated sulphuric acid with a red-brown colouration. The absorption maxima in ethanol are about 636, 583 and (542) and in concentrated sulphuric acid (593), 544 and 508.

The new brominated derivative dyes acetate silk in reddish blue shades and consists merely of dibromo-5.8-dihydroxy-1.4-naphthoquinone-imine-(1).

*Example 6*

50 parts of a technical mixture consisting of di- and tri-bromo-5-amino-8-hydroxy-1.4-naphthoquinone-imine-(1) are dissolved in 200 parts of 94% sulphuric acid and stirred during 24 hours under slow addition of 300 parts of glacial acetic acid. The solution which, at the beginning, was yellow in color becomes green during this treatment, a precipitation of blue needles taking place. The precipitated product is filtered and isolated. It is a tribromo-5.8-dihydroxy-1.4-naphthoquinone-imine-(1).

The filtered sulphuric acid solution is then poured into ice and water, whereby a blue precipitate is obtained. It is filtered, washed free from acid and dried. The product thus obtained is dibromo-5.8-dihydroxy-1.4-naphthoquinone-imine-(1).

What we claim is:

1. A process for the manufacture of a halogenated 5.8-dihydroxy-1.4-naphthoquinone-imine-(1) which comprises the step of subjecting a halogenated 5 - amino - 8 - hydroxy - 1.4 - naphthoquinone-imine-(1) to hydrolysis in an acid medium.

2. A process for the manufacture of a halogenated 5.8-dihydroxy-1.4-naphthoquinone-imine-(1) which comprises the step of subjecting a halogenated 5-amino-8-hydroxy-1.4-naphthoquinone-imine-(1) to hydrolysis in dilute sulphuric acid.

3. A process for the manufacture of a dihalogenated 5.8 - dihydroxy - 1.4 - naphthoquinone-imine-(1) which comprises the step of subjecting a dihalogenated 5-amino-8-hydroxy-1.4-naphthoquinone-imine-(1) to hydrolysis in dilute sulphuric acid.

4. A process for the manufacture of 3.7-dichloro - 5.8 - dihydroxy - 1.4 - naphthoquinone-imine-(1) comprising the step of subjecting 3.7-dichloro - 5 - amino - 8 - hydroxy - 1.4 - naphthoquinone-imine(1) to hydrolysis in dilute sulphuric acid.

5. A process for the manufacture of 3.7-dibromo - 5.8 - dihydroxy - 1.4 - naphthoquinone-imine-(1) comprising the step of subjecting 3.7-dibromo - 5 - amino - 8 - hydroxy - 1.4 - naphthoquinone-imine-(1) to hydrolysis in dilute sulphuric acid.

6. A process for the manufacture of 3.6-dibromo - 5.8 - dihydroxy - 1.4 - naphthoquinone-imine-(1) comprising the step of subjecting 3.6-dibromo - 5 - amino - 8 - hydroxy - 1.4 -naphthoquinone-imine-(1) to hydrolysis in dilute sulphuric acid.

7. The halogenated 5.8-dihydroxy-1.4-naphthoquinone-imines-(1), selected from the class consisting of the chlorinated and brominated 5.8 - dihydroxy - 1.4 - naphthoquinone - imines-(1).

8. The dihalogenated 5.8-dihydroxy-1.4-naphthoquinone-imines-(1) of the formula
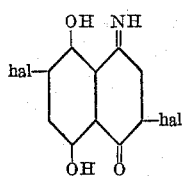
wherein hal stands for a member of the group consisting of Cl and Br.
9. The 3,7-dichloro-5.8-dihydroxy-1.4-naphthoquinone-imine-(1).
10. The 3.7-dibromo-5.8-dihydroxy-1.4-naphthoquinone-imine-(1).
11. The 3.6-dibromo-5.8-dihydroxy-1.4-naphthoquinone-imine-(1).
VALENTIN KARTASCHOFF.
ERNST MERIAN.
No references cited.